Figure 1:
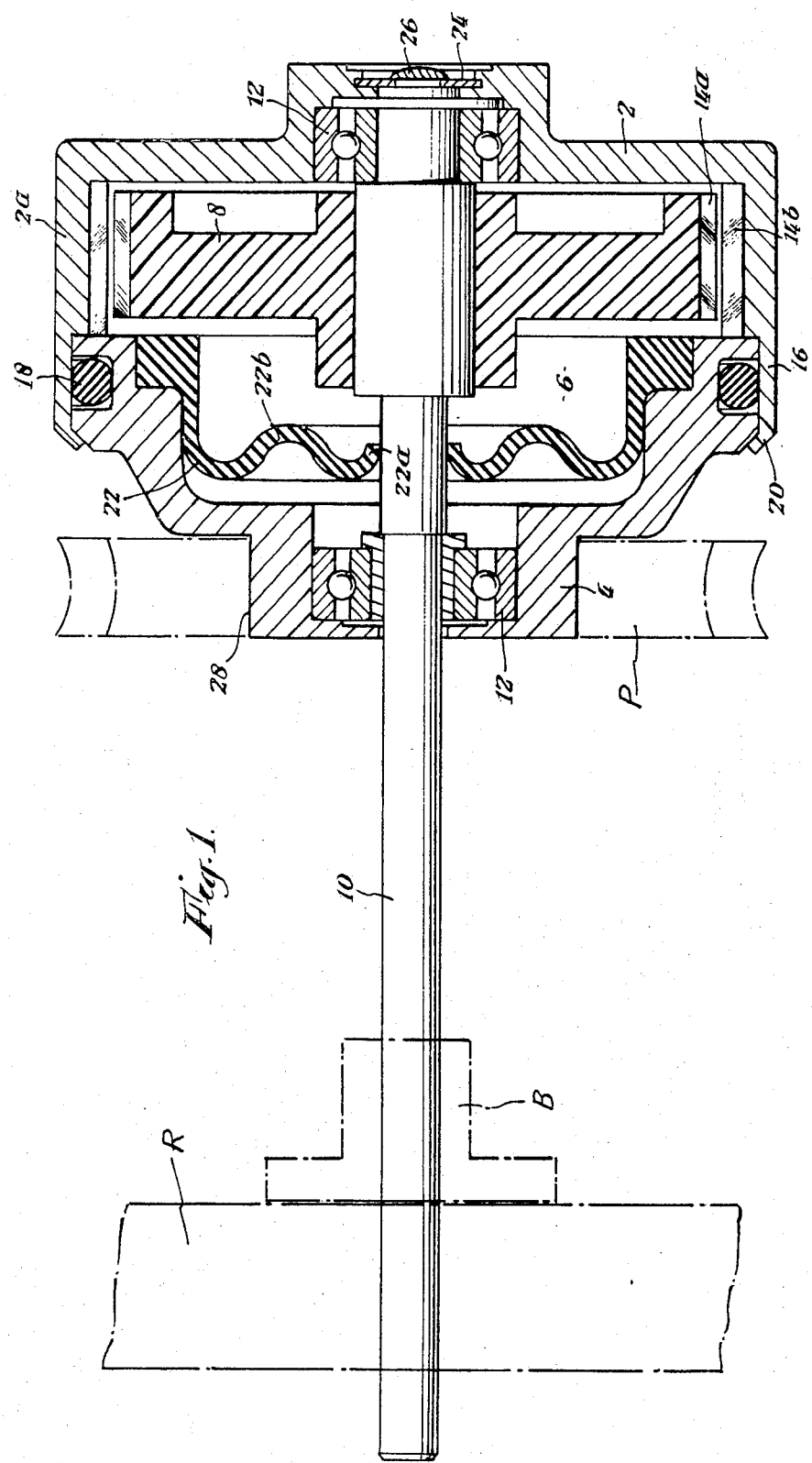

United States Patent [19]
Nash

[11] 3,861,503
[45] Jan. 21, 1975

[54] DAMPERS

[76] Inventor: Alan Richard Brine Nash, 39 Abbots Ride, Farnham, England

[22] Filed: Jan. 16, 1973

[21] Appl. No.: 324,104

[30] Foreign Application Priority Data
Jan. 21, 1972   Great Britain...................... 3017/72

[52] U.S. Cl............... 188/276, 188/290, 192/58 A, 277/96, 277/212 R
[51] Int. Cl.............................................. F16f 9/52
[58] Field of Search............ 188/276, 290; 277/96 R, 277/96 A, 212 R; 192/58 A, 58 B, 58 C

[56]   References Cited
   UNITED STATES PATENTS

| | | | |
|---|---|---|---|
| 1,203,265 | 10/1916 | Radcliffe | 192/58 A |
| 2,088,180 | 7/1937 | Stevens | 277/212 |
| 2,699,846 | 1/1955 | Pitman et al. | 192/58 B |
| 2,781,208 | 2/1957 | Foss | 277/212 |
| 3,007,560 | 11/1961 | Weir | 192/58 B |
| 3,010,742 | 11/1961 | Kosatka | 277/96 A X |
| 3,107,752 | 10/1963 | McLean | 188/276 |
| 3,407,908 | 10/1968 | Smith | 188/290 X |
| 3,543,885 | 12/1970 | Ditlow | 188/290 |

*Primary Examiner*—George E. A. Halvosa
*Attorney, Agent, or Firm*—Nichol M. Sandoe

[57]   ABSTRACT

A damper of the type functioning by viscous shear of a damping fluid in a narrow space between relatively movable members of the damper has said members made of materials with different thermal expansion rates so arranged that the clearance between the members at said space changes with temperature in a way which compensates for the corresponding change of viscosity of the fluid. Means compensating also for the change of fluid volume with temperature comprise, in a continuous rotation damper of the viscous shear type, a deformable sealing member that also provides a sliding seal between the two members.

9 Claims, 3 Drawing Figures

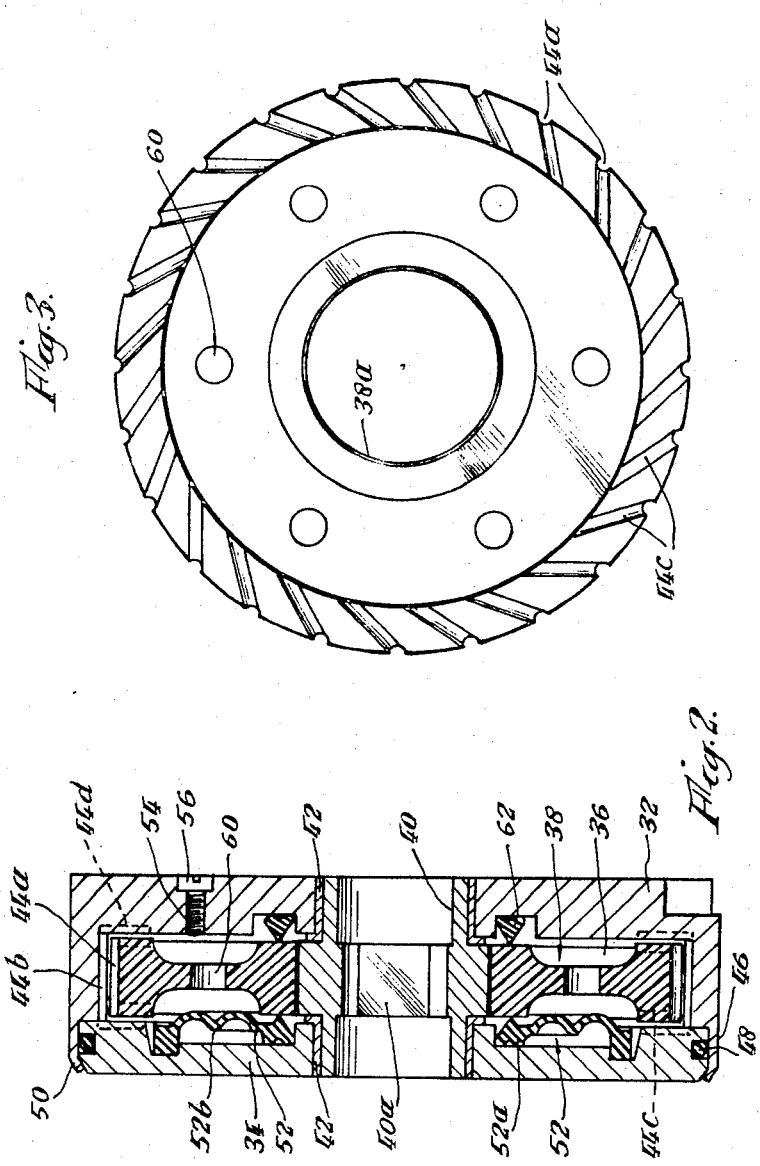

DAMPERS

This invention relates to dampers in which a resistance to relative movement of two members is offered by the viscous shear forces developed in a fluid in a space between the members. Such apparatus, referred to hereinafter simply as "dampers" may comprise members relatively rotatable to each other, whereby the fluid shear forces provide a torque between the members, or may comprise members that are relatively linearly displaceable.

A difficulty arising in the design and operation of such dampers is that changes of temperature, that may themselves arise from the dissipation of energy in the fluid shear effect, can alter the damping characteristic quite considerably.

It is an object of the invention to provide in an economical and efficient manner, means for limiting to effects of temperature changes on the operating characteristics of such dampers.

According to one aspect of the invention, there is provided a damper having a body providing a fluid-filled chamber within which a displacement member is located such that a damping effect is provided by the resistance of the fluid to relative rotation between the body and the displacement member, the body and said member being of materials having different thermal expansion rates such that there is a change in the clearance between them that at least partly compensates for associated changes of fluid viscosity with temperature whereby to reduce variations in the damping effect with change of temperature.

According to a further aspect of the invention, there is provided a continuous rotation damper comprising a body within which a fluid-filled chamber is provided, a rotor unit projecting into the chamber and mounted on bearing means to be rotatable relative to the body, and a sealing member between the body and the rotor unit defining an end wall of the chamber and providing a sliding seal between the body and the rotor unit, said sealing member arranged to be deformable to a degree that permits it to adjust the chamber volume to compensate for relative changes of fluid volume with changes of temperature.

Conveniently, the damper body comprises a first member having a portion defining a peripheral wall of the fluid-filled chamber, a peripheral part of said portion overlapping an outer surface of a second body member and being sealingly secured against said surface of the second member. An end region of said first member peripheral part may be deformable inwardly in the assembly of the damper to engage the second member and secure the body members together. To provide for such an assembly arrangement, preferably said peripheral part of the first member has a reduced thickness at least in the region where it is inwardly deformable.

One embodiment of the invention will now be described by way of example with reference to the accompanyng drawings, wherein:

FIG. 1 shows one form of continuous rotation damper according to the invention in axial cross-section, FIG. 2 shows another form of damper according to the invention in axial cross-section, and, FIG. 3 is an end view of the rotor of the damper in FIG. 2.

Referring to FIG. 1 of the drawings, the body of the damper comprises two main rigid members 2, 4. Within the body is a chamber 6 that is filled with a damping fluid, e.g. a silicone fluid, in the assembly of the unit. A rotor unit comprises a disc-like rotor 8 secured to a shaft 10 mounted on rolling bearings 12 at opposite ends of the body, the rotor being located within the chamber 6. The rotor may be moulded from nylon or another plastics material and can be either preformed and then pinned or keyed to the shaft 10 or can be mounted in situ on the shaft.

The main damping effect in this construction will arise from the shear forces that occur in the dashpot fluid with relative rotation between the rotor and the body. The fluid shear resistance will be greatest in the small clearance between the outer periphery of the rotor and the opposed inner periphery of the body member 2 and at the rotor/body interface here there are series of axial grooves 14a, 14b provided in the facing peripheral surfaces of the rotor and body respectively. These grooves have the function of stabilizing the fluid shear rate at high rates of rotation. To avoid undesirable effects, the angular spacings of the grooves in the rotor are different from those in the body member 2.

The body members are conveniently die-cast, e.g. from the zinc alloy known under the trade name Mazak or Zamak, or aluminum, and it is a feature of the construction that the thermal expansion co-efficient of the body material is considerably less than that of the rotor material — in the materials quoted as examples, the nylon rotor expansion rate is about ten times that of the body expansion rate. Thus, with change of temperature the clearance between the rotor and the body at the outer periphery of the rotor decreases, so tending to increase the shear resistance in the damping fluid between them. At the same time, any temperature increase will have reduced the viscosity of the fluid (in the present example the flui may be Dow Corning DC 200 series silicone fluid) thereby tending to reduce the shear resistance, and the materials employed are so selected that these two counteracting effects as nearly as possible balance each other out.

For the assembly of the two body members together, the outer peripheral wall 2a of the member 2 comprises a main thicker section containing the grooves 14b and a thinner end section 16 that overlaps an end portion of the second member 4 in the axial direction of the rotor. Said overlapping portions fit each other closely and, in addition, an O-ring 18 in a recess in the outer wall of the second member 4 ensures a seal between the two body members. The two members are finally secured together by peening or rolling over the extreme peripheral edge 20 of the first member once the members have been assembled together: the adjacent region of the member 4 is made sufficiently massive to withstand the pressures developed in the deformation of the edge 20.

Before assembly of the rotor and first body member 2 to the second body member 4, a neoprene sealing member 22 is bonded to the inside end region of the member 4 and serves to define one end of the fluid-filled chamber in the assembled damper. A central inner aperture is provided in the sealing member 22 by an inner peripheral portion 22a in the form of a lip that is directed inwardly into the chamber, in a more or less axial direction. This central aperture allows insertion of the shaft 10 such that said peripheral portion 22a engages the shaft with a light pressure to form a sliding seal therewith. By virtue of the axially inwardly turned form of the peripheral portion 22a engaging the shaft, seepage of air into the fluid-filled chamber is excluded. One or more circumferential corrugations 22b in the region of the sealing member between its inner and outer sealing regions allow this intermediate region to be deformed relatively easily and the member is thus also able to flex to accommodate changes of volume of the damping fluid with changes of temperature.

When the body members have been assembled and secured together with the shaft and rotor and the corrugated sealing member in place, the fluid for the damper chamber can be introduced through a brass washer 24 peened into place in an open end face of the member 2, there being a central aperture in the washer for this purpose. After filling the chamber under vacuum conditions, the washer aperture is sealed by solder 26 so that the chamber is rendered permanently fluid-tight.

The damper described is particularly suitable for production as a small and compact unit to be employed to control reeling or winding operations, where it is usually required to ensure that some tension is maintained in the material being wound or unwound and that sudden changes of tension are avoided as far as possible. For example, the damper could control the rotation of a reel of recording tape, as in a cassette tape recorder, with the tape reel non-rotatably secured on the projecting end of the shaft 10, as indicated at R, above a bushing B that supports the damper axially and a drive transmitted to the shaft through a wormwheel secured to the body of the damper, for which purpose a turned collar 28 is formed on the member 4. Thus, the drive to the wormwheel rotates the body and the rotor is then in turn rotated, by the fluid friction effect between it and the body, to rotate the reel. Slippage in the drive is able to occur, in response to changes in the tape tension, by relative rotation between the rotor and body.

In the embodiment of FIGS. 2 and 3, the damper body again comprises a pair of die-cast members 32, 34 that form a chamber 36 containing a rotor 38. The rotor has a splined connection (as at 38a) with or is moulded integrally onto a hollow steel hub 40 such that the rotor and hub are secured together rotationally, the hub being journalled in the damper body on anti-friction bushes 42.

As in the first-described embodiment, the cylindrical inner and outer peripheries of the body and rotor have a small clearance between them and in said peripheries are series of axial grooves 44a, 44b. The outer margins of the end faces of the rotor are also disposed close to opposed end faces of the chamber 36 and in said end face regions the rotor has further series of grooves 44c running obliquely to the radial direction so as to exert a slight pumping effect on the fluid. The grooves 44c are continuous with the grooves 44a but the angular spacings of the series of grooves 44a, 44b are different, as in the first-described embodiment, to avoid undesirable cyclic effects. If desired, oblique grooves 44d can be provided on the body members additionally to or instead of the grooves 44c in the faces of the members opposite the grooves 44c to assist or give the required pumping effect.

In this second embodiment, the chamber volume is relatively small and a series of apertures 60 is formed in the rotor to assist the circulation of the damping fluid around its outer peripheral region by the pumping effect of the grooves 44c and/or 44d and so reduce the possibility of break down or instability in the fluid shear rate at higher speeds.

The manner of securing the two body members 32, 34 together relies, as before, on the deformation of a thin peripheral edge 50 of a relatively thin end section 46 of the member 32 and an O-ring 48 ensures a seal between the closely fitting overlapping portions of the two members. As in the first-described embodiment, the rotor and the dashpot body are of materials, as already exemplified, having different thermal expansion rates so as to compensate for the change of viscosity of the chamber fluid with increase of temperature and so maintain a more even damping rate over a temperature range.

For sealing between the rotor and the body, two sealing members 52, 62 are provided, the main member 52 being bonded to one of the body members 34 similarly to the sealing member 22 of the first-described embodiment. In its inner peripheral region, the sealing member 52 comprises a thickened annular portion 52a that is held between the body member 34 and the rotor and the second sealing member 62, having a cross-section similar to the portion 52a of the first member, is held between the opposite face of the rotor and the body member 32. The spacing of the members 32, 34 is such that the sealing members are lightly compressed and the rotor is thus sandwiched between the two sealing members with the angular form of the cross-sections of the portion 52a and the member 62 providing lines of sealing at the same radius of opposite faces of the rotor. One or more circumferential corrugations 52b in the sealing member 52 outwardly of its inner annular portion allow this intermediate region to deform relatively easily so that the member can flex to accommodate to changes of volume of the damping fluid with change of temperature.

After the assembly of the damper the chamber is filled with damping fluid through an aperture 54 subsequently sealed by a screw 56.

In operation, the damper can be used in a similar manner to the first-described example with a rotary drive being transmitted between its body and a shaft (not shown) engaging flats 40a on the hub 40. Alternatively, there may be applications in which one of the relatively rotatable parts of the damper is held fixed so that a resistance is generated on rotation of the other part — e.g. the casing can be clamped fixed so that the motion of a shaft engaging the hub 40 is retarded or damped.

What I claim and desire to secure by letters patent is:

1. A damper comprising, in combination, a body, a fluid-filled chamber in the body, a rotor unit projecting into the chamber and bearing means locating said unit in a rotatable manner relative to the body, said rotor unit comprising a rotor, respective opposed surfaces of the body and of the rotor having a clearance between them such that a damping effect is provided by viscous shear of the chamber fluid between said surfaces resisting said relative rotation between the body and the rotor, respective series of axially extending grooves being provided on the radially outer region of said rotor surface and on an adjacent inwardly facing region of said body surface, the body comprising first and second members with at least a peripheral part of the first member overlapping a radially outwardly facing surface of the second member, an end portion of said peripheral part axially spaced from said grooves being radially inwardly deformed to secure the members together, a sealing member for the fluid in the chamber being enclosed within the body and having mutually remote portions engaging the body and the rotor unit sealingly, one of said portions providing a sliding seal, said sealing member defining an end wall of the chamber and being provided with at least one circumferential corrugation intermediate said remote portions whereby the seal is flexibly deformable to a degree that permits it to compensate for changes of the chamber fluid volume with changes of temperature, the fluid having a viscosity that changes with temperature and the body being formed from metal and the displacement member being formed from a plastics material, said plastics material having a thermal expansion rate of about ten times that of the metal body so that there is a change in the clearance between said respective opposed surfaces which at least partly compensates for the associated fluid viscosity change with temperature whereby to reduce variations in the damping effect with change of temperature.

2. A continuous rotation damper comprising, in combination, a metal body, a fluid filled chamber in the body, a displacement member of plastics material located in the chamber, a carrier secured to the displacement member to form a unit therewith and bearing means connecting the unit and said body in a relatively rotatable manner, a radially outer surface of the displacement member and a radially inwardly facing surface of the body being located adjacent each other, respective series of axially extending grooves being provided on said member and body surfaces, the body comprising two parts that are sealingly secured together at a position axially spaced from said series of grooves, a sealing member enclosed within the body and extending between the body and said rotary unit and having mutually spaced portions engaging said body and unit to define an end wall of the fluid-filled chamber and provide a sliding seal between the body and the rotary unit, said sealing member being flexibly deformable to a degree that permits it to adjust the chamber volume to compensate for thermal expansion and contraction of the fluid in the chamber over a large range of temperature, the plastic materials of the displacement member having a thermal expansion rate of about ten times that of the metal body so that there is a change in the spacing between said adjacent surfaces with change of temperature that at least partly compensates for the variation of viscosity with temperature of the fluid in the chamber whereby to reduce variations in the damping effect with changes of temperature.

3. A damper according to claim 2 wherein said sealing member has a substantially annular form and comprises an inner peripheral portion providing said sliding seal with the rotary unit said portion being in the form of a lip directed substantially axially inwardly into the fluid-filled chamber.

4. A damper according to claim 2 wherein a further seal is provided on the other side of the rotary displacement member to said sealing member such that opposite faces of the rotary displacement member are engaged between said sealing member and said further seal.

5. A damper according to claim 2 wherein said body comprises first and second members, the first member having a portion defining a peripheral wall of said chamber, a surface of said second member facing outwardly being overlapped by at least a peripheral part of said first member portion and being sealingly secured thereto.

6. A damper according to claim 5 wherein an end region of said first member portion axially displaced from the grooves is deformable inwardly to secure the body members together.

7. A damper according to claim 6 wherein said peripheral wall portion of the first member has a reduced thickness at least in the region that is inwardly deformable.

8. A damper according to claim 5 wherein an O-ring seal is provided between said first and second members of the body.

9. A damper according to claim 2 wherein said sealing member is provided with at least one circumferential corrugation in a region intermediate the body and rotary unit to permit said flexible deformation of the member.

* * * * *